(12) United States Patent
Plant et al.

(10) Patent No.: US 11,607,046 B2
(45) Date of Patent: Mar. 21, 2023

(54) SEATING WITH A MECHANISM TO RAISE AND LOWER AN ARMREST

(71) Applicant: Blue Cube (GB) Ltd, London (GB)

(72) Inventors: Russell Plant, London (GB); Daniel Ho, London (GB)

(73) Assignee: BLUE CUBE (GB) LTD., London (GB)

( * ) Notice: Subject to any disclaimer, the term of this patent is extended or adjusted under 35 U.S.C. 154(b) by 0 days.

(21) Appl. No.: 17/149,322

(22) Filed: Jan. 14, 2021

(65) Prior Publication Data

US 2021/0219728 A1 Jul. 22, 2021

(30) Foreign Application Priority Data

Jan. 16, 2020 (GB) ...................................... 2000692

(51) Int. Cl.
  *A47C 7/54* (2006.01)
  *A47C 1/031* (2006.01)
  *F16H 25/16* (2006.01)
  *F16H 53/06* (2006.01)
  *A47C 1/12* (2006.01)

(52) U.S. Cl.
  CPC .............. *A47C 7/541* (2018.08); *A47C 1/031* (2013.01); *A47C 1/12* (2013.01); *F16H 25/16* (2013.01); *F16H 53/06* (2013.01)

(58) Field of Classification Search
  CPC ......... A47C 7/543; A47C 7/541; A47C 1/121; A47C 7/56; A47C 1/12; A47C 1/031; F16H 25/16; F16H 53/06

USPC ..................................................... 297/411.32
See application file for complete search history.

(56) References Cited

U.S. PATENT DOCUMENTS 8,070,233 B2 * 12/2011 Schumacher ........ B64D 11/064
  297/411.32

FOREIGN PATENT DOCUMENTS

| DE | 4135841 A1 | * | 5/1993 | ............. A47C 7/563 |
|----|-----------|---|--------|------------------------|
| EP | 0713663 A1 | * | 5/1996 | ............. E05D 11/06 |
| GB | 2262880 A | | 7/1993 | |
| JP | H0313233 Y2 | * | 3/1991 | |
| JP | 2009213604 A | * | 9/2009 | |
| KR | 20010081186 A | * | 8/2001 | |

* cited by examiner

*Primary Examiner* — Milton Nelson, Jr.
(74) *Attorney, Agent, or Firm* — MH2 Technology Law Group LLP

(57) ABSTRACT

A mechanism for raising and lowering an armrest for a seat includes an armrest, a rotatable hub, and an actuating linkage between the armrest and the hub, the rotatable hub having a cam that operates the actuating linkage to raise the armrest wherein the cam can rotate through a first angle of rotation where the actuating linkage is not operated a second angle of rotation where the actuating linkage is operated. The cam can rotate through a third angle of rotation where the actuating linkage is not operated, this angle being different to the first angle of rotation. The cam is torsionally linked to the rotation of a seat member.

8 Claims, 10 Drawing Sheets

SEATING WITH A MECHANISM TO RAISE AND LOWER AN ARMREST

CROSS-REFERENCE TO RELATED APPLICATIONS

This patent application claims priority under 35 U.S.C. § 119 from UK patent application 2000692.0, filed Jan. 16, 2020, the entire contents of which is incorporated by reference herein.

TECHNICAL FIELD

The present invention relates to seating, and is particularly, although not exclusively, concerned with auditorium or arena seating.

BACKGROUND

Folding seats are often used in auditoriums and arenas, in order to provide additional floorspace when the seats are not being used. The seat of the chair folds into a vertical orientation when not in use, and into a horizontal position in order to be used. When the seats are arranged in several rows or tiers, this is particularly useful for allowing people to pass unoccupied seats, allowing the rows or tiers of seats to be more compactly arranged.

GB2262880 shows such a seating system, where the movement of the seat is linked to the movement of an armrest, so that as the seat is folded from a horizontal unused orientation to a vertical orientation ready for use, the armrest also moves from a horizontal unused orientation to a vertical orientation. However, the linkage of this system causes the armrest to move together with any movement of the seat, and this is inconvenient. Small movement of the seat while in a substantially horizontal orientation can result in corresponding movements of the armrest. A similar effect occurs when the seat is in a substantially vertical unused position, where small movements of the seat cause corresponding movements of the armrest, and vice versa.

SUMMARY

An objection of the present invention is to reduce the occurrence of one or both of these effects.

According to the present invention there is provided a seating arrangement as provided by claim 1.

'Angle of rotation' refers to the rotatable cam rotating from one angle to another angle through the angle of rotation.

In order that the present invention may be more fully understood a specific embodiment will now be described by way of example with reference to the accompanying drawings, of which:

DETAILED DESCRIPTION

References to orientations and directions left, right, upwards, downwards, clockwise and anti-clockwise are to be interpreted according to the representations shown in the figures. References to orientations and directions forwards and rearwards are to be interpreted with reference to a seat where the forward direction is the direction a user would be looking in if they were seated.

Figure 1:
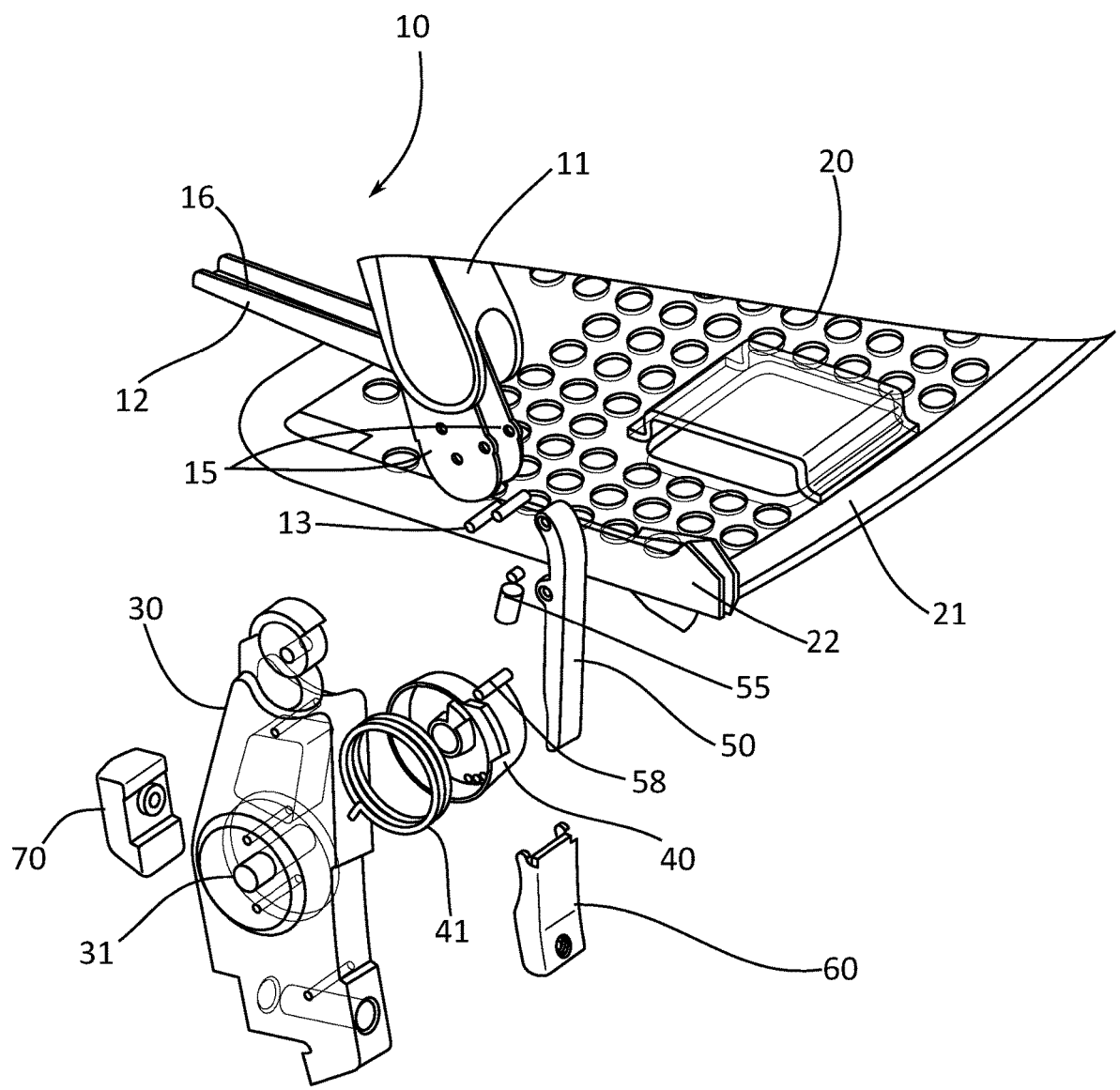
FIG. 1 shows an exploded perspective view of an embodiment of the seat system.

Referring to FIG. 1, the seat comprises a support stem 30, a seat hub 40, a seat 20, and an armrest 10. An actuating linkage 50, front clamp 70, and back stop 60 also form part of the mechanism.

Each support stem 30 may support a seat on one or both sides, so that the support stem 30 includes a seat hub 40, a seat 20, armrest 10 and actuating linkage 50 associated with each seat.

Figure 2:
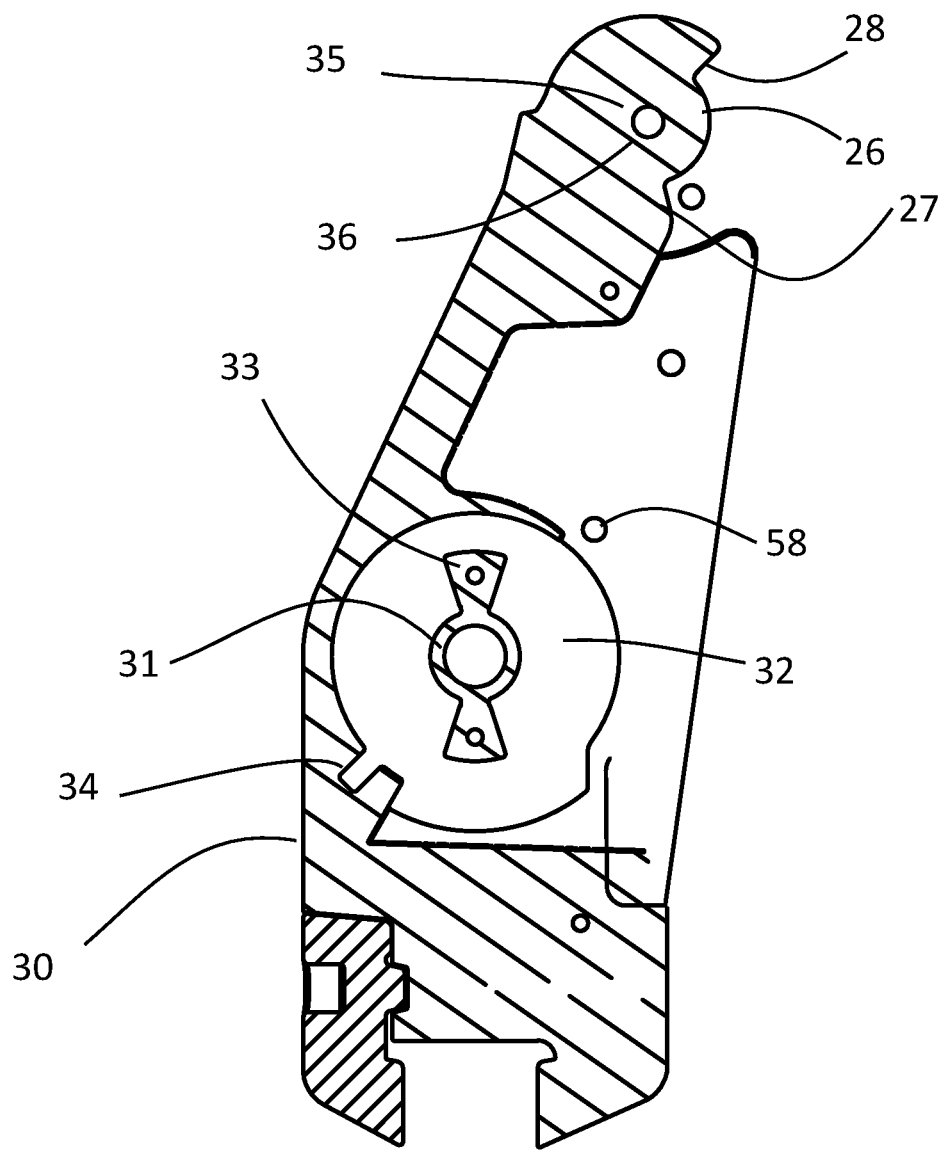
FIG. 2 shows a sectional view of the support stem of the seat system.
Figure 5:
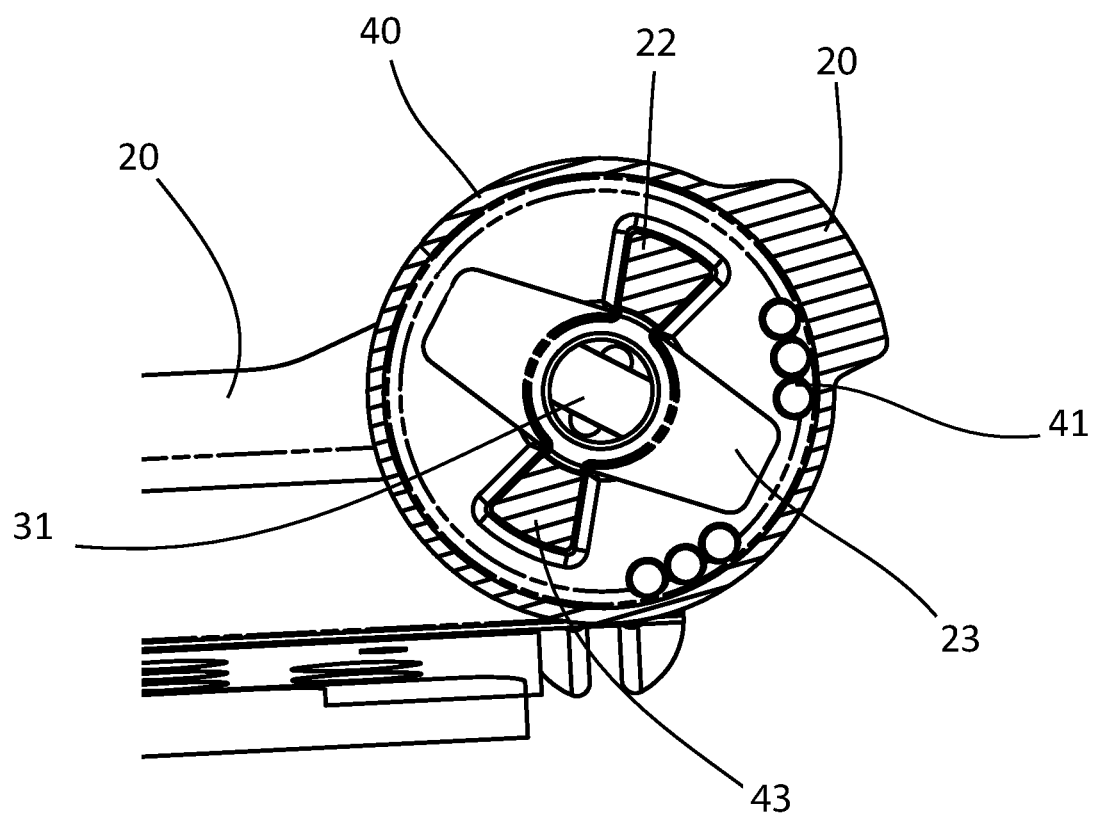
FIG. 5 shows a sectional view of part of the seat and the seat hub of the seat system.

Referring also to FIG. 2, the support stem 30 has a seat hub cavity 32 which receives the seat hub 40 when assembled. Referring also to FIG. 5, the seat hub cavity 32 includes seat pivot bore 34 which bears a seat pivot pin 31. Radiating from the bore are stop members 33.

Referring to figure to FIGS. 1 and 2, the support stem 30 extends generally upwardly (though with a rearward inclination) to a support stem hinge part 35, which includes a support stem armrest bore 36 which the armrest 10 pivotally attaches to.

The support stem hinge part 35 includes arcuate contact surface 26 between a first limit surface 27 and a second limit surface 28; in use, as will be described below, the upper contact point 56 (shown in FIG. 3) of the actuating linkage 50 bears against these surfaces on the support stem hinge part 35.

Figure 3:
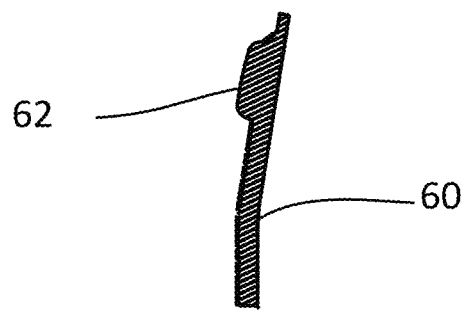
FIG. 3 shows a sectional view of the back stop of the seat system.
Figure 4:
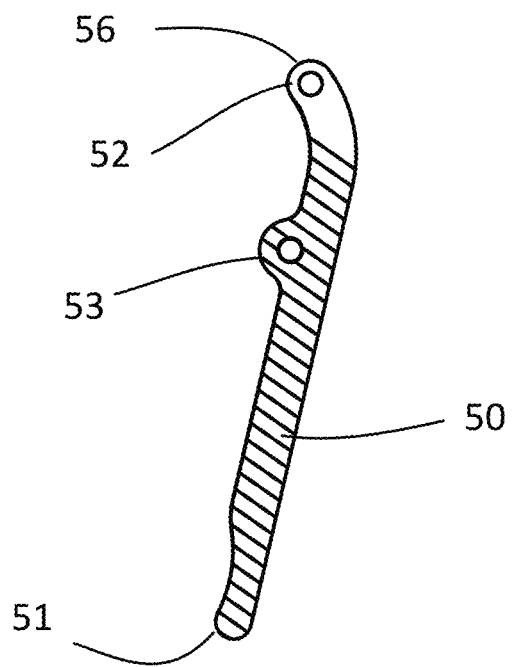
FIG. 4 shows a sectional view of the actuating linkage of the seat system.

Referring to FIG. 3, the back stop 60 is generally elongate, but includes a raised portion 62 on one side. The back stop 60 is fixedly secured to the support stem 30.

The actuating linkage 50 is generally elongate, and features an actuating linkage armrest bore 52 by which means the actuating linkage 50 is pivotally linked to the armrest 10 by an actuating linkage pivot pin 57.

Referring to FIG. 5, the seat 20 includes a seat attachment member 22, which is mounted on the seat pivot pin 31. The seat attachment member 22 includes to radially extending arms 23. The seat pivot pin 31 extends through a seat hub pivot bore 44, so that the seat hub 40 and the seat 20 can pivot about a common axis.

The seat hub 40 includes a torsion spring 41, one end of which is secured to a retaining groove 37 in the seat hub cavity 32, and the other end of which is secured to the seat hub 40. The seat hub 40 includes seat hub stop members 43 which radially extend from the seat hub pivot bore 44. The seat hub 40 is generally cylindrical, and features a cam lobe 42 on its outer edge surface.

Referring to figure back to FIG. 1, the armrest 10 comprises an armrest steel 12, which includes two similar lateral walls 15 spaced apart and joined by a supporting web 16 which runs along part of the edges of the lateral walls 15. An armrest cover 11 of generally similar shape to the armrest steel 12 fits on top of the armrest steel 12.

The armrest steel 12 pivotally joins to the support stem 30 with an armrest pivot pin 13 which extends through an armrest pivot hole 17 and the seat pivot bore 34 on the support stem hinge part 35.

Figure 7:
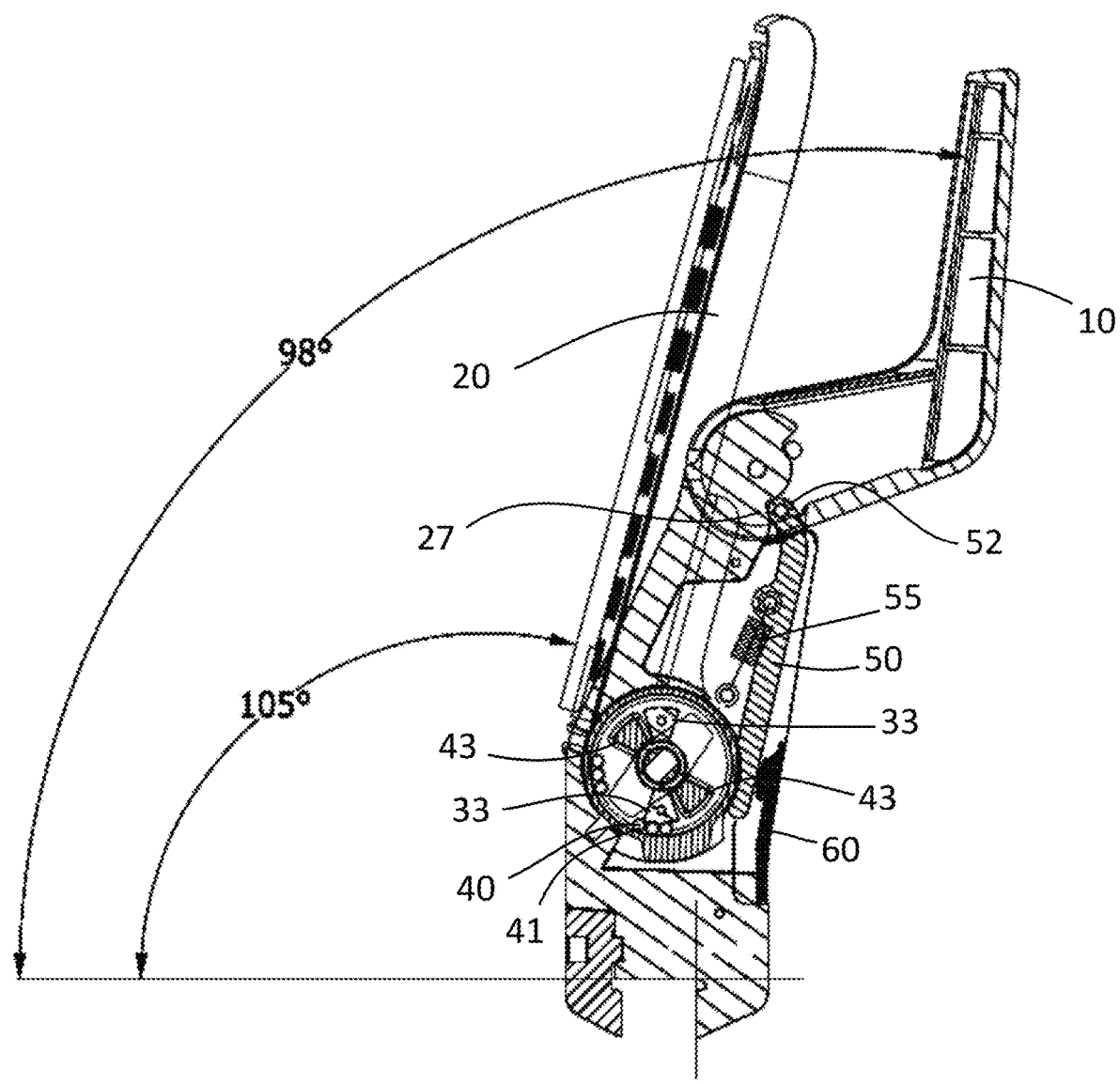
FIGS. 7 to 10 show a sectional view of the seat, armrest and other operating parts of the system where the seat is moving between the upright, unused, position and the down, used, position.

Referring to FIG. 7, the seat 20 is shown in its upright position. The armrest 10 is also in its fully upright position. The torsion spring 41 acts to try to rotate the seat hub 40 in a clockwise manner, however the seat hub stop members 43 abut the support stem stop members 33, preventing the seat hub 40 for rotating further. Since the seat 20 is rotationally secured with respect to the seat hub 40, the seat is steady in the upright position.

A tension spring 55 is secured at one end to an actuating linkage tension spring hole 53 on the actuating linkage 50, and at the other end to the body of the support stem 30. This subjects the actuating linkage 50 to a generally downward force from the tension spring 55, and the lower part of the actuating linkage 50 is constrained between the seat hub 40 and the back stop 60, while the upper contact point 56 of the actuating linkage 50 is constrained by the first limit surface 27 of the support stem hinge part 35. Additionally or alternatively, the movement of the armrest 10 may be constrained by a stud or pin 18 on the armrest 10 abutting the second limit surface 28.

The actuating linkage 50 and the armrest 10 are pivotally connected by a seat pivot pin 31 that extends through an actuating linkage armrest hole 52 on the actuating linkage 50 and ensures that the armrest 10 is held steady in the upright position.

Figure 8:
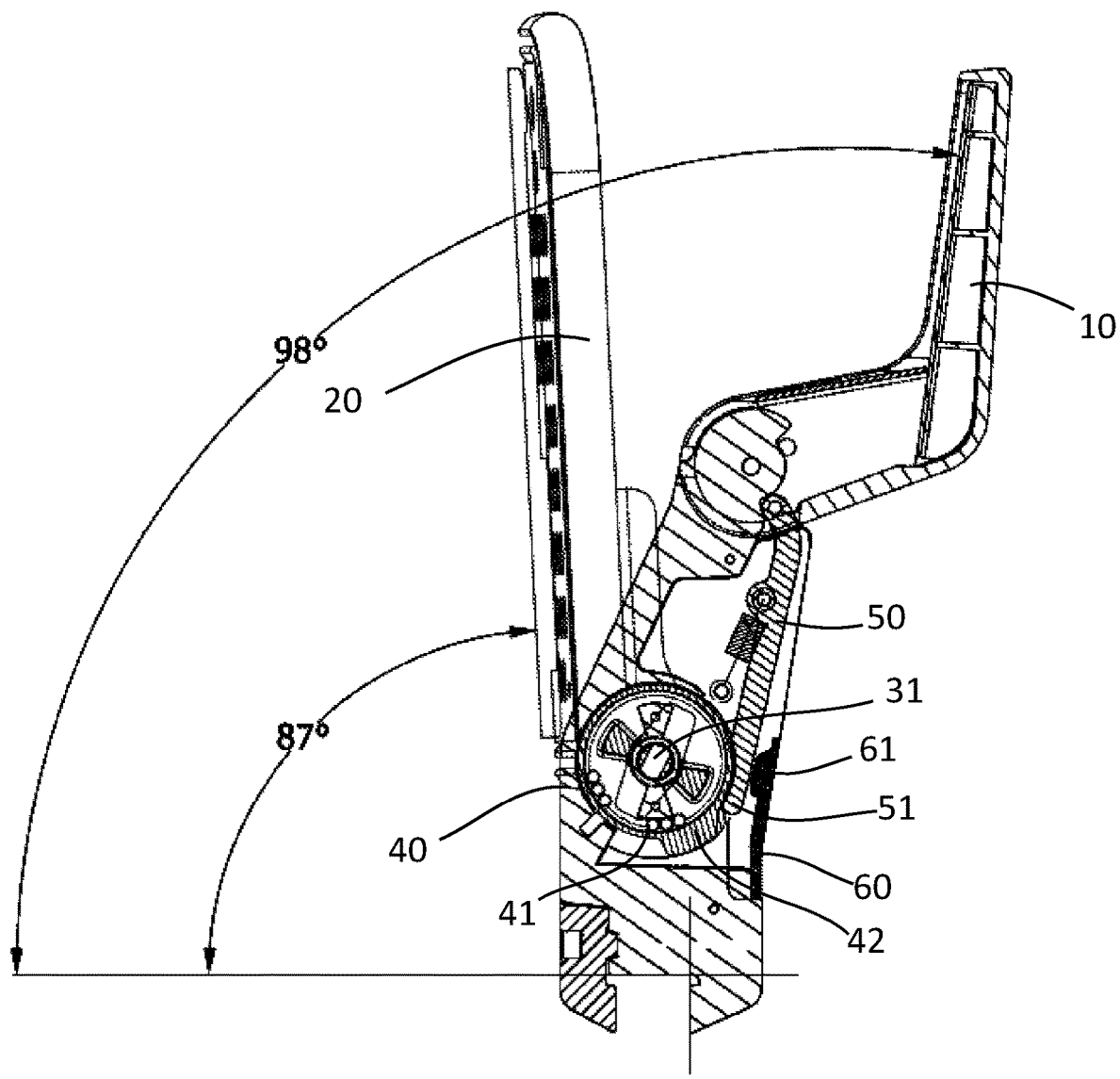

Referring to FIG. 8, as a user draws the seat 20 downwardly (i.e. pivoting the seat 20 about pivot pin 57 to decrease the angle between the seat 20 and the horizontal), the seat hub 40 rotates clockwise about the seat pivot pin 31 until the cam lobe 42 of the seat hub 40 abuts the lower contact point 51 of the actuating linkage 50. The actuating linkage 50 has not moved during the transition of the seat 20 from the position shown in FIG. 7 to the position shown in FIG. 8, and consequently, the armrest 10 has also remained stationary and steady.

Figure 9:
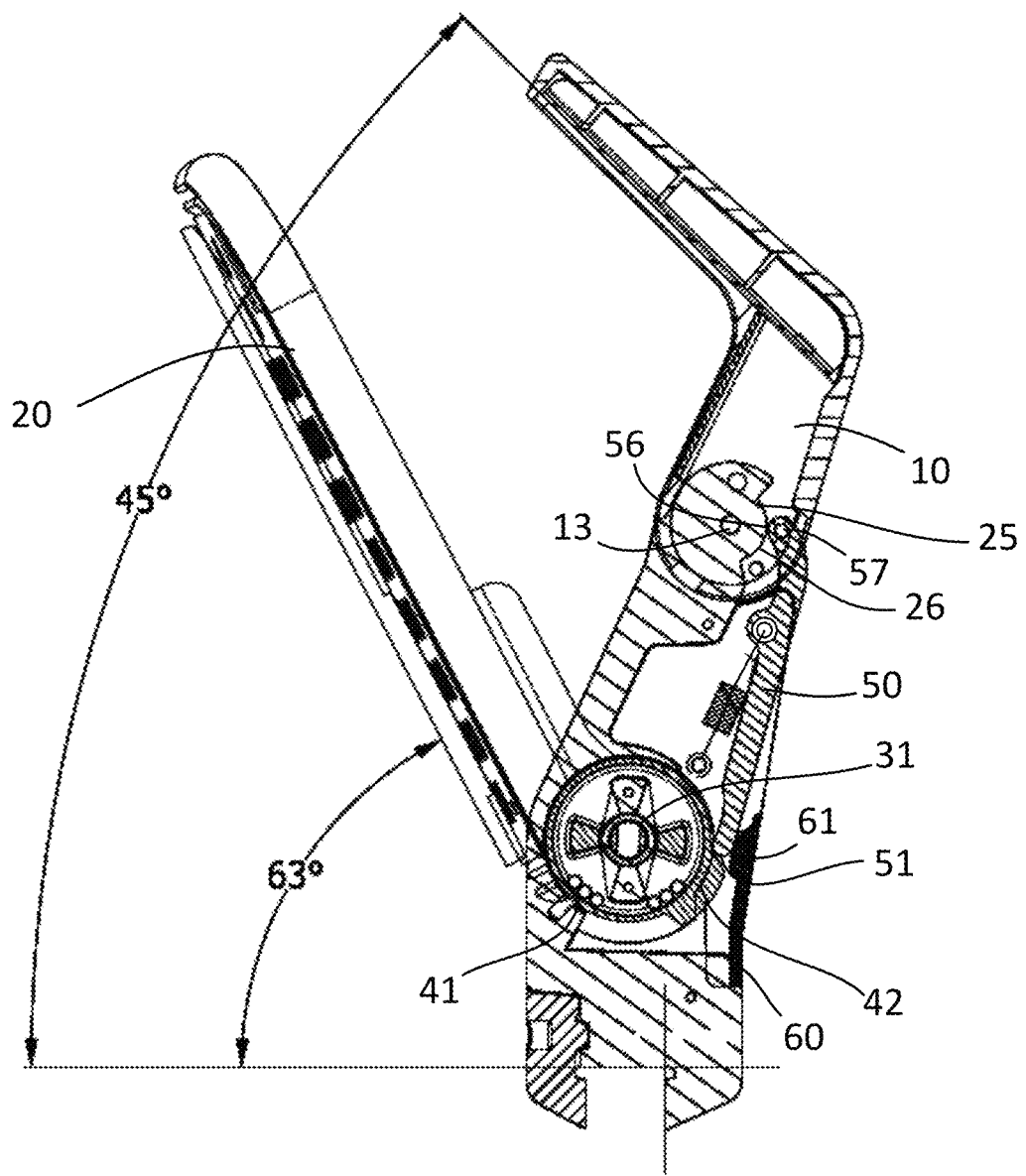

Referring to FIG. 9, as the user draws the seat 20 further downwardly pivoting the seat 20 decrease the angle between the seat 20 towards the horizontal as shown, the seat hub 40 further rotates clockwise about the seat pivot pin 31, where a leading ramp portion of the cam lobe 42 causes the lower contact point 51 be pushed generally upwards (though at an inclination from the vertical). The actuating linkage 50 is still constrained by the raised portion 62 of the back stop 60, so the actuating linkage 50 is pushed upwards.

As the actuating linkage 50 is pivotally secured to the armrest 10 by the actuating linkage pivot pin 57, the armrest 10 is forced to pivot about the armrest pivot pin 13, moving the armrest 10 downwardly (i.e. diminishing the angle between the armrest 10 and the horizontal). The upper contact point 56 of the actuating linkage 50 follows the arcuate contact surface 26 of the support stem hinge part 35.

Figure 10:
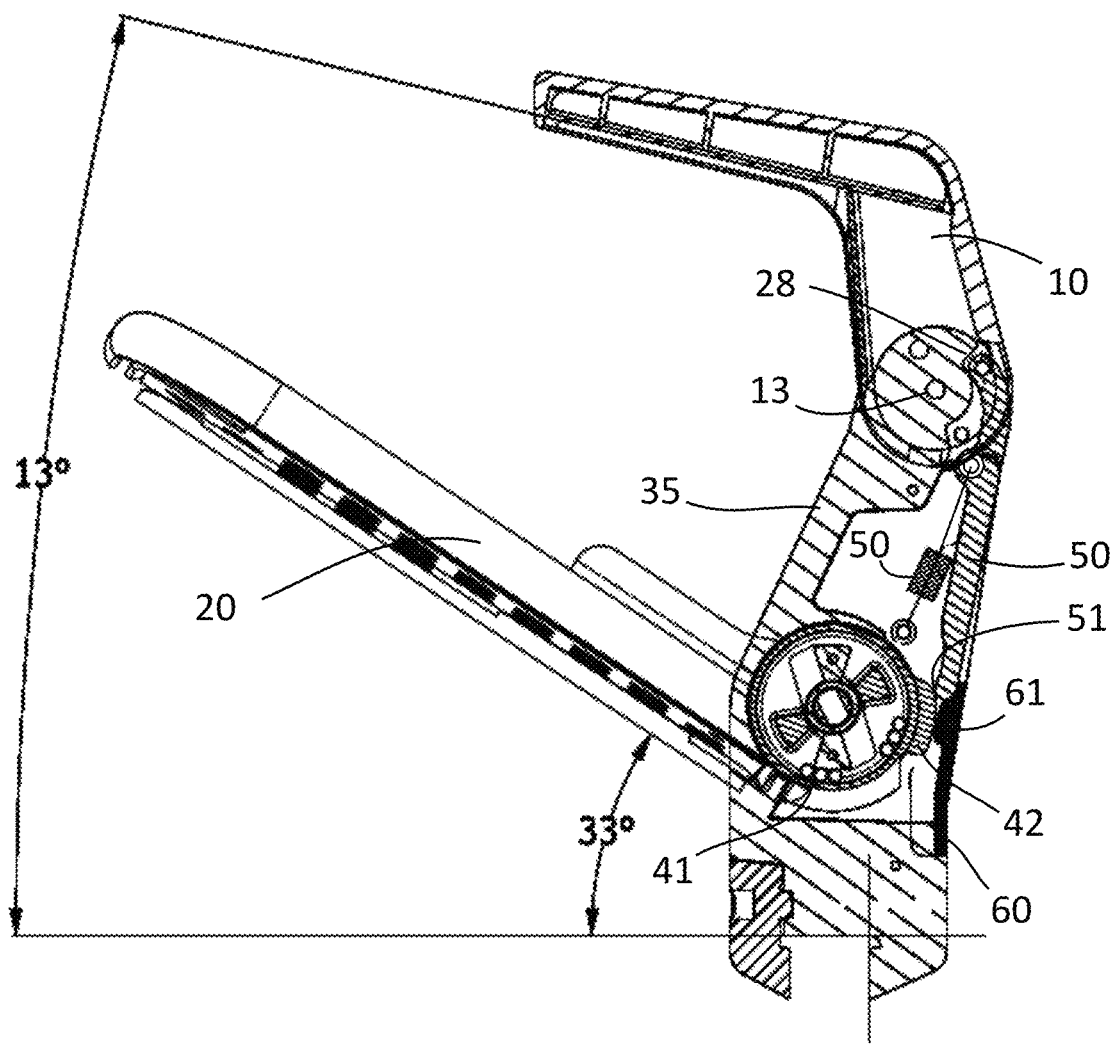

Referring to FIG. 10, as the seat 20 is lowered towards a horizontal position, actuating linkage 50 continues to be pushed upwardly and the armrest 10 continues to pivot about the armrest pivot pin 13, until the lower contact point 51 of the actuating linkage 50 clears the raised portion 62 of the back stop 60. At this point, the actuating linkage 50 has room to move backwards and clear the leading ramp of the cam lobe 42 of the seat hub 40, and further clockwise rotation of the seat hub 40 does not move the actuating linkage 50. The upper contact point 56 of the actuating linkage 50 also abuts the second limit surface 28 of the support stem hinge part 35, so that the armrest 10 is held securely in its fully downward position (the armrest, as shown here, need not be fully horizontal).

Figure 11:
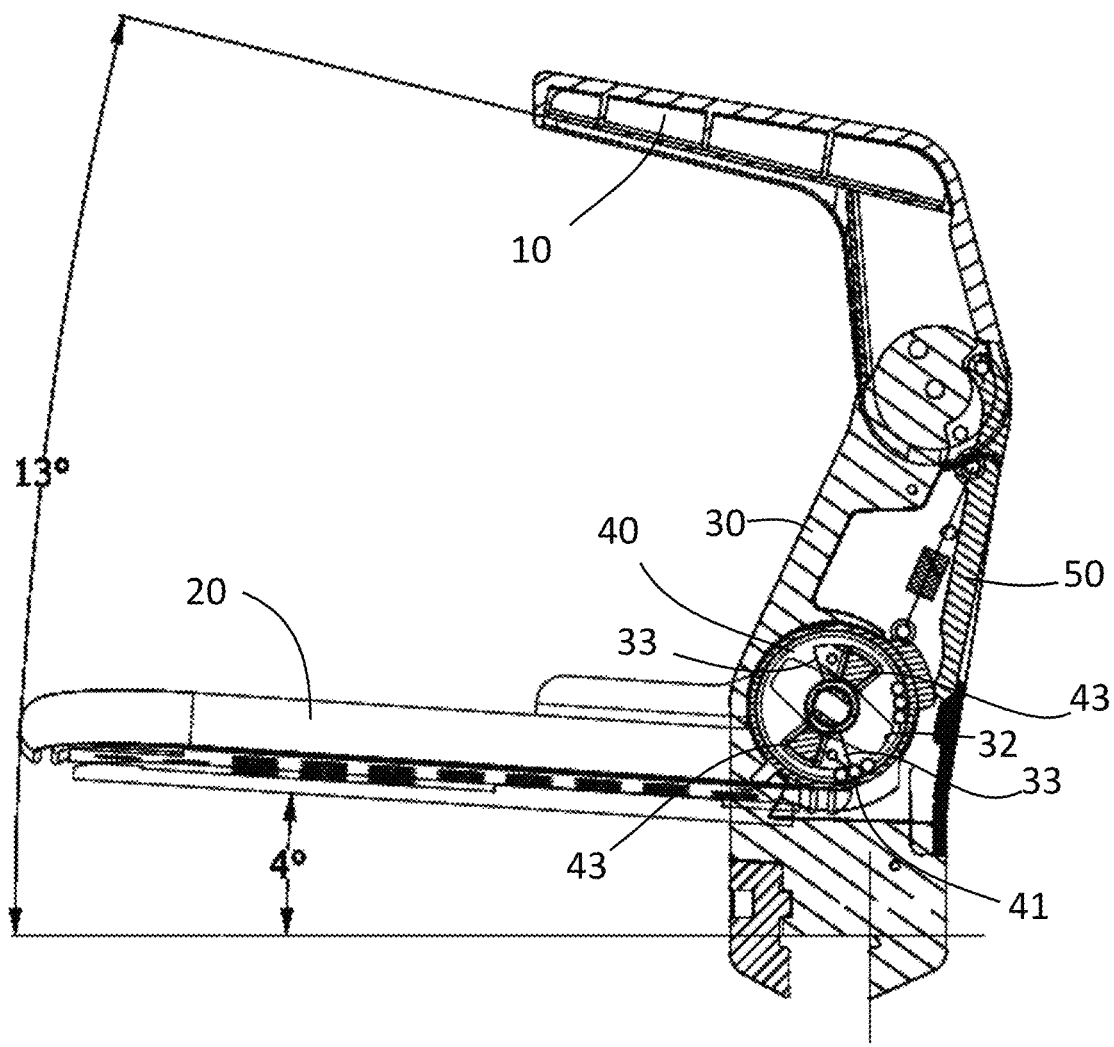
FIG. 11 shows a sectional view of the seat, armrest and other operating parts of the system where the seat is in the down, used, position.

Referring to FIG. 11, the user can continue to lower the seat 20, which rotates the seat hub 40 clockwise until the seat hub stop members 43 abut the stop members 33 of the seat hub cavity 32 of the support stem 30. The actuating linkage 50 and armrest 10 remains constrained in the position shown in FIG. 10.

When a user rises from the seat 20, the torsion spring 41 in the seat hub 40 urges the seat hub 40 to rotate anti-clockwise, which starts the raise the seat 20 (i.e. increases the angle between the seat 20 and the horizontal). This essentially reverses the process and steps shown in FIGS. 7 to 11.

Figure 6:
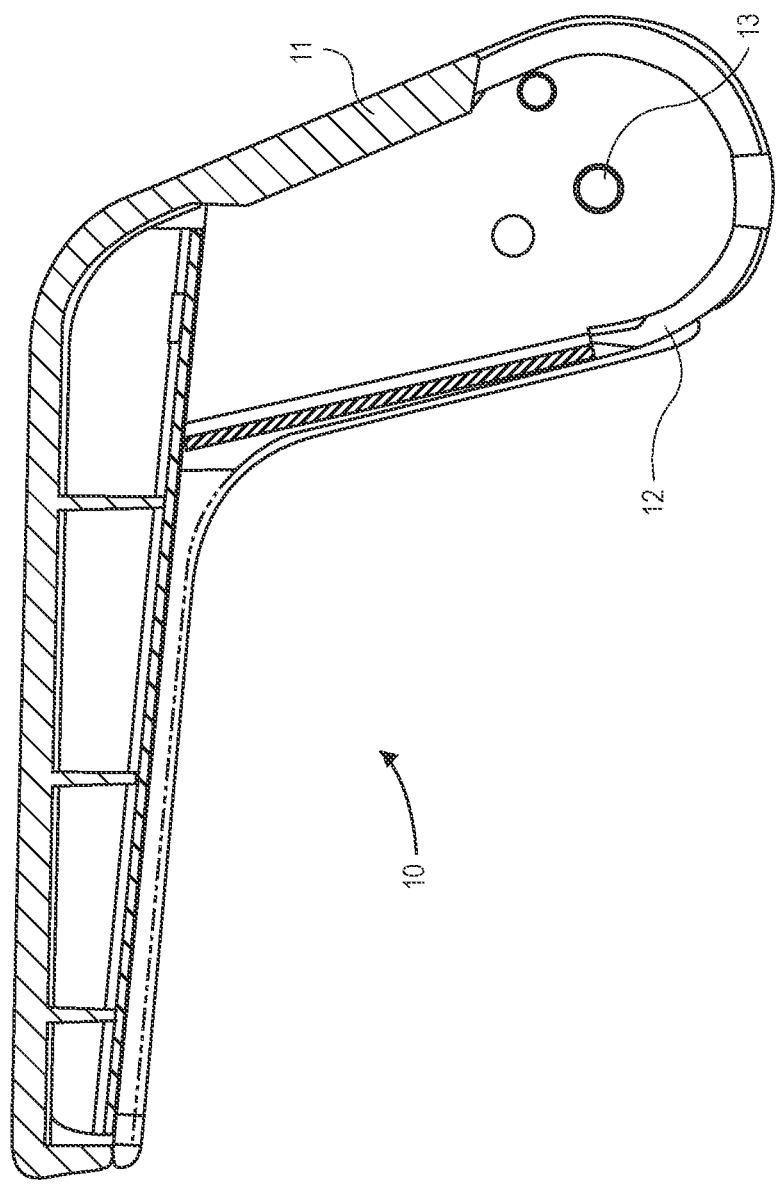
FIG. 6 shows a sectional view of the seat, armrest and other operating parts of the system where the seat is in the upright, unused, position.

As the seat 20 is raised under the urging of the torsion spring 41, the actuating linkage 50 is urged generally downwards by the tension spring 55. This causes the lower contact point 51 of the actuating linkage 50 to follow the cam lobe 42 as the seat hub 40 rotates anti-clockwise in the positions shown in FIGS. 9 and 8, until the actuating linkage 50 is constrained in position between the seat hub 40 and the back stop 60 as shown in FIGS. 7 and 6. As the actuating linkage 50 moves generally downwards, the armrest 10 pivots upwardly (increase the angle between the armrest 10 and the horizontal) about the armrest pivot pin 13 from the position shown in FIG. 10, through the position shown in FIG. 9, to the finally upright position shown in FIG. 8.

It will be seen that when the seat 20 is lowered from the positions shown in FIGS. 7 and 8 (or lowered when the procedure is reversed), there is no movement of the armrest 10 from its fully upright position. Similarly, when the seat 20 is lowered from the positions shown in FIGS. 10 and 11 (or lowered when the procedure is reversed), there is no movement of the armrest 10 from its fully lowered position. This means that there are two slop zones or ranges of movement of the seat the seat 20 in near its fully raised or fully lowered positions where corresponding movement of the armrest 10 is eliminated. It will be noted that less ideally, a seat system where armrest movement is eliminated for only one such slop zone of the seat could be implemented with small alterations of the system.

When used in a row of seats, each seat will have two armrests on either side, while all but the outermost armrests will be shared between adjacent seats. These armrests will have two actuating linkages, controlled by two seat hubs and the other components described herein, each of the lateral walls 15 of the armrest steel 12 being attached to one actuating linkage 50. The support stem 30 includes a seat hub cavity 32 on each side to receive the two seat hub 40 for adjacent seats. Referring to FIGS. 7 to 11, the actuating linkage 50 may be drawn upwards through the lowering of the armrest 10 be an adjacent actuating linkage, while the seat hub 40 remains stationary and the seat 20 in its raised position. Thus, the position of an armrest having two seats in common is determined by whichever seat is in the lowermost position.

It should also be noted that the armrest position as described herein is determined by the rotation of a seat. However, the movement of the actuating linkage and armrest could be operated by a common shaft linking several armrests. Further, the movement could be adapted so that the raising and lowering of the seats is operated by a rotating hub and actuating linkage 50 linked indirectly to one or more seats, or independently of the seats.

In this specification an apparatus/method/product "comprising" certain features is intended to be interpreted as meaning that it includes those features, but that it does not exclude the presence of other features.

Many variations are possible without departing from the scope of the present invention as defined in the appended claims.

The invention claimed is:

1. A mechanism for raising and lowering an armrest for a seat, comprising:
   an armrest;
   a rotatable hub;
   an actuating linkage between the armrest and the hub; and
   the rotatable hub having a cam that operates the actuating linkage to rotate the armrest to and from an upright position; wherein the cam can rotate through a first angle of rotation where the actuating linkage is not operated, and through a second angle of rotation where the actuating linkage is operated, the cam being torsionally linked to the rotation of a seat member.

2. The mechanism according to claim 1 wherein the cam can rotate through a third angle of rotation where the actuating linkage is not operated, this angle being different to the first angle of rotation.

3. The mechanism according to claim 1 wherein the actuating linkage is biased in one direction of rotation by a resilient member.

4. The mechanism according to claim 1 wherein the cam comprises a cylindrical shape having a cam lobe on its outer surface.

5. The mechanism according to claim 1 wherein one end of the actuating linkage is constrained through part of its movement between the cam and a back stop part.

6. The mechanism according to claim 5 wherein the back stop part allows the actuating linkage to clear an upper part of the back stop part for part of the actuating linkage movement.

7. The mechanism according to claim 1 wherein the rotatable hub is rotated by the pivoting of a seat.

8. The mechanism according to claim 1 wherein the rotatable hub is biased in one direction of rotation by a resilient member.

* * * * *